(12) United States Patent
Miller et al.

(10) Patent No.: US 11,298,623 B1
(45) Date of Patent: Apr. 12, 2022

(54) BATTERY RETENTION METHODS AND MECHANISMS FOR HANDHELD CONTROLLERS

(71) Applicant: Facebook Technologies, LLC, Menlo Park, CA (US)

(72) Inventors: Robin Michael Miller, Redmond, WA (US); Chin Yuan Cheng, Kirkland, WA (US); Raymond Louis Nicoli, Seattle, WA (US); Balaji Chelladurai, Bellevue, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 104 days.

(21) Appl. No.: 16/677,859

(22) Filed: Nov. 8, 2019

(51) Int. Cl.
 *A63F 13/92* (2014.01)

(52) U.S. Cl.
 CPC ...... *A63F 13/92* (2014.09); *A63F 2300/1043* (2013.01)

(58) Field of Classification Search
 CPC ............ A63F 13/92; A63F 2300/1043; H01M 2200/30; B29L 2031/7146; H01H 2231/008
 See application file for complete search history.

(56) References Cited

U.S. PATENT DOCUMENTS

| | | | | |
|---|---|---|---|---|
| 5,922,489 | A * | 7/1999 | Adachi | H01M 4/52 429/100 |
| 9,269,943 | B1 * | 2/2016 | Nelson | H01R 43/20 |
| 2011/0311858 | A1 * | 12/2011 | Lim | H01M 50/213 429/158 |
| 2016/0134045 | A1 * | 5/2016 | Chen | H01R 12/716 439/700 |
| 2016/0240826 | A1 * | 8/2016 | Oota | H01M 50/213 |
| 2016/0259404 | A1 * | 9/2016 | Woods | G06F 3/017 |

* cited by examiner

*Primary Examiner* — Peter S Vasat
*Assistant Examiner* — Thomas H Henry
(74) *Attorney, Agent, or Firm* — FisherBroyles, LLP

(57) ABSTRACT

The disclosed handheld controller may include a handle shaped and sized to be gripped by a user's hand and a battery compartment in the handle. The battery compartment may be configured to receive a replaceable battery that has a first end portion with a negative terminal and a second, opposite end portion with a positive terminal. The battery compartment may include a spring-loaded negative contact for electrically coupling to the negative terminal of the battery and a spring-loaded positive contact for electrically coupling to the positive terminal of the battery. Various other methods and systems are also disclosed.

13 Claims, 11 Drawing Sheets

900

Position a replaceable battery within a battery compartment of a handheld controller
910

↓

Depress a spring-loaded negative contact in the battery compartment with a negative terminal of the battery
920

↓

Depress a spring-loaded positive contact in the battery compartment with a positive terminal of the battery
930

↓

Retain the battery in the battery compartment with spring forces from both the spring-loaded negative contact and the spring-loaded positive contact
940

*FIG. 9*

BATTERY RETENTION METHODS AND MECHANISMS FOR HANDHELD CONTROLLERS

BRIEF DESCRIPTION OF THE DRAWINGS

The accompanying drawings illustrate a number of example embodiments and are a part of the specification. Together with the following description, these drawings demonstrate and explain various principles of the present disclosure.

FIG. 9 is a flow diagram of an example method of retaining a replaceable battery in a handheld controller, according to at least one embodiment of the present disclosure.

Figure 1:
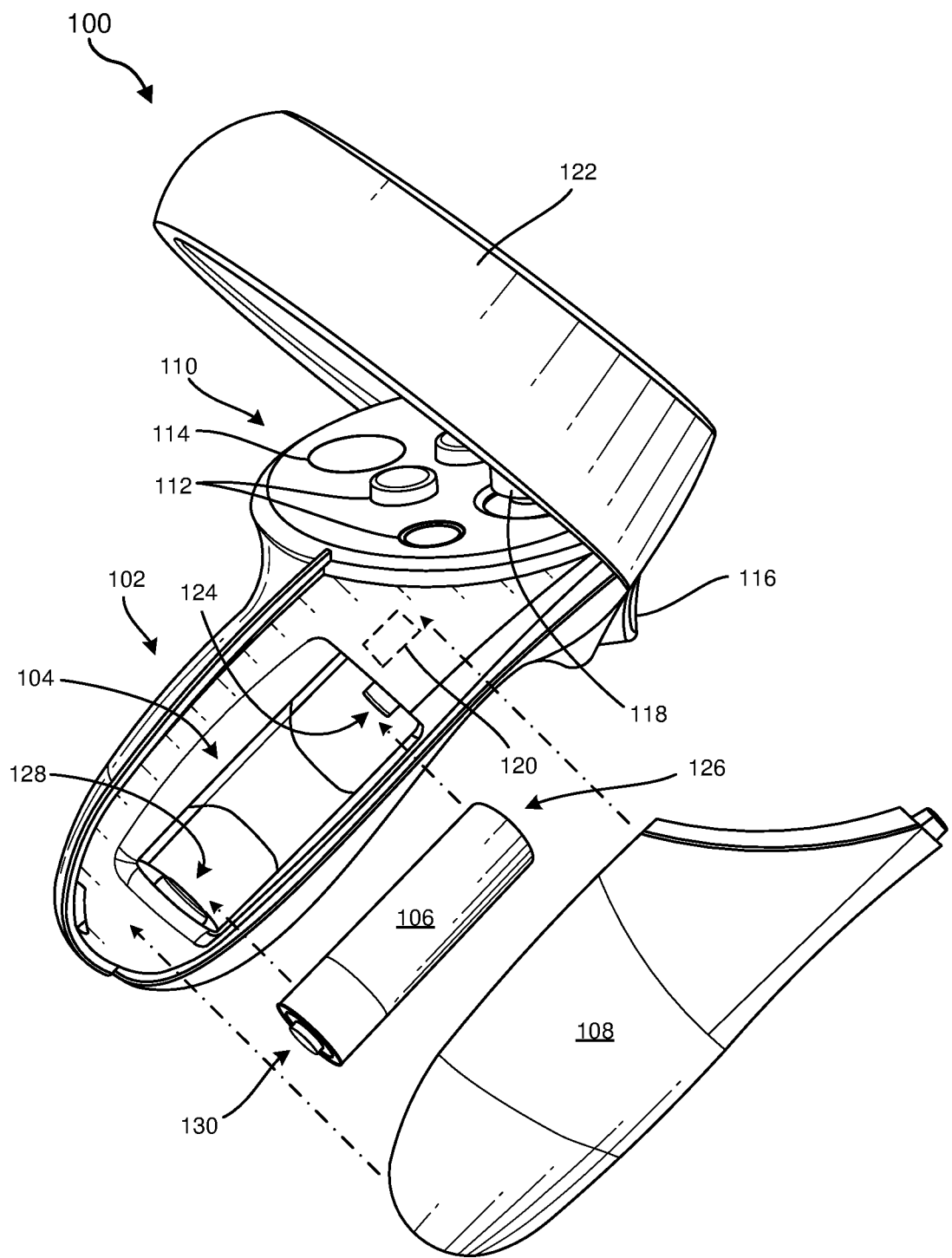
FIG. 1 is an exploded perspective view of a handheld controller, according to at least one embodiment of the present disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

Artificial-reality systems, such as virtual-reality systems or augmented-reality systems, typically display computer-generated content (often via a head-mounted display ("HMD")) to users in order to create immersive experiences. For example, a virtual-reality system may create three-dimensional ("3D") renderings to simulate an environment or a virtual space. Alternatively, augmented-reality systems may merge computer-generated content with a user's view of a real-world environment to enhance interactions with the real-world environment. These systems may provide users with the ability to navigate and alter digital content that may provide helpful information about real-world objects.

Handheld controllers for artificial-reality systems (and for other computer systems or gaming systems) are often designed for use in a 3D space. The user may move the handheld controller in 3D space to manipulate or interact with real or virtual objects that are displayed to the user, such as on an associated HMD. Some handheld controllers include multi-degree of freedom ("multi-DOF") sensors, such as to sense speed, acceleration, position, orientation, etc., of the handheld controllers. For example, handheld controllers may include one or more accelerometers and one or more gyroscopes. The user may move the handheld controller rapidly and with high acceleration. Such rapid movements sometimes result in movement and/or dislodging of internal components of the handheld controller, such as a battery. If a battery becomes momentarily or permanently dislodged, the handheld controller may stop working, which may disrupt use of the handheld controller and negatively impact a user's experience.

The present disclosure is generally directed to methods and mechanisms for battery retention in handheld controllers. As will be explained in greater detail below, embodiments of the present disclosure may include handheld controllers that have a handle shaped and sized to be gripped by a user's hand and a battery compartment in the handle. The battery compartment may include a spring-loaded negative contact for electrically coupling to a negative terminal of a battery and a spring-loaded positive contact for electrically coupling to a positive terminal of the battery. By spring-loading both contacts, the battery may be securely retained in the battery compartment, thus inhibiting (e.g., reducing or eliminating) dislodging of the battery during normal use of the handheld controller, such as in 3D space.

Features from any of the embodiments described herein may be used in combination with one another in accordance with the general principles described herein. These and other embodiments, features, and advantages will be more fully understood upon reading the following detailed description in conjunction with the accompanying drawings and claims.

Figure 10:
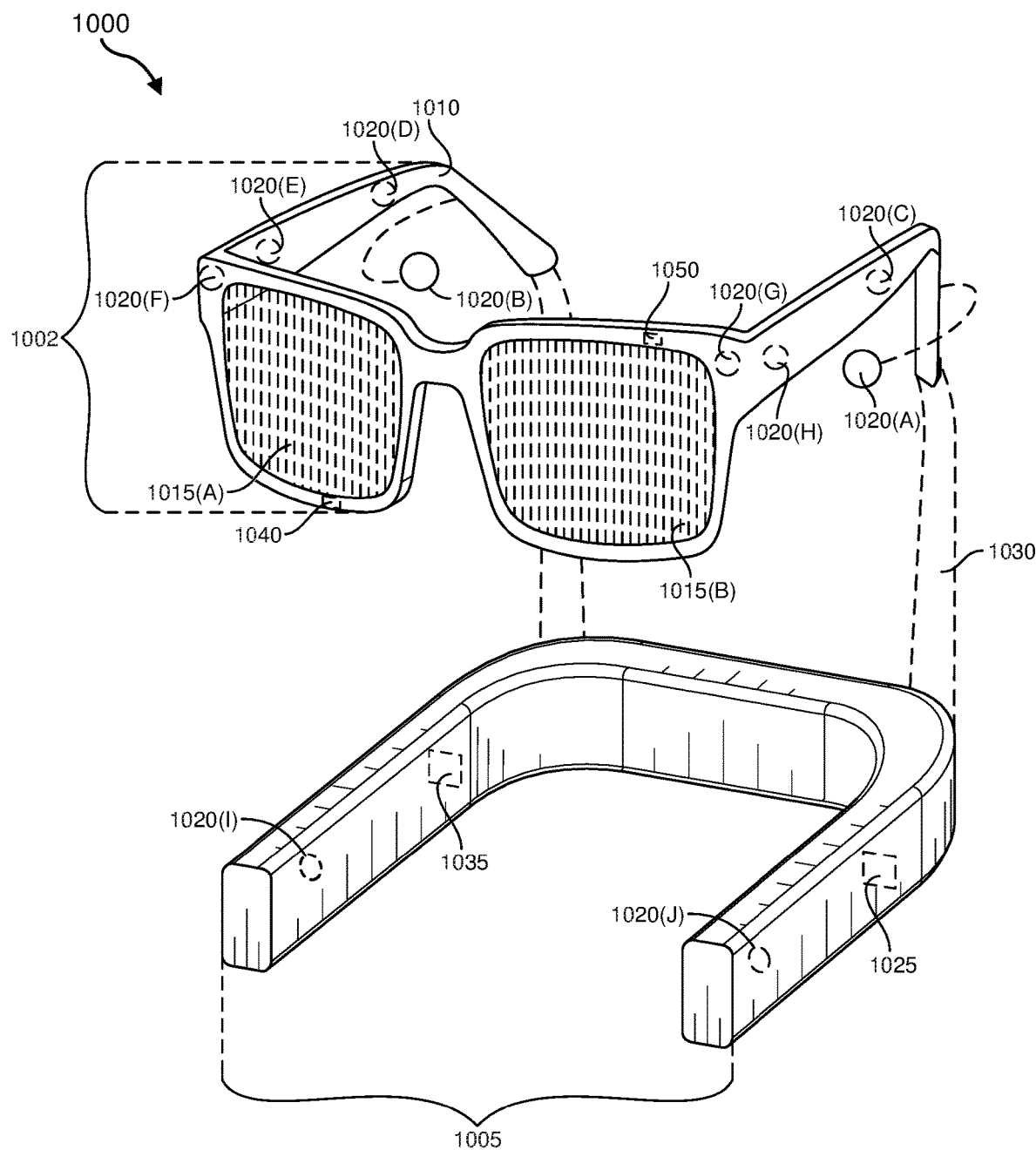
FIG. 10 is an illustration of example augmented-reality glasses that may be used in connection with embodiments of this disclosure.

The following will provide, with reference to FIGS. 1-7, detailed descriptions of handheld controllers that include spring-loaded positive and negative contacts for electrically coupling to corresponding battery terminals. With reference to FIGS. 8 and 9, detailed descriptions of an environment and method for use of such handheld controllers will be provided. With reference to FIGS. 9 and 10, detailed descriptions of example artificial-reality systems that may be used in connection with embodiments of the present disclosure will be provided.

FIG. 1 is an exploded perspective view of a handheld controller 100. The handheld controller 100 may include a handle 102 that is shaped and sized to be gripped by a user's hand. A battery compartment 104 for receiving at least one replaceable battery 106 may be located in the handle 102. A removable battery compartment cover 108 may be shaped and sized for covering the battery compartment 104 when the handheld controller 100 is in use. The handheld controller 100 may also include one or more user inputs 110 that may be manipulated by the user, such as one or more buttons 112, touch-sensitive surfaces 114, triggers 116 (e.g., an index finger trigger, a third-finger trigger, etc.), joysticks 118 (e.g., a thumbstick), motion sensors 120 (e.g., a multi-DOF sensor including at least one of a gyroscope, an accelerometer, an inertial measurement unit ("IMU"), etc.), and/or optical tracking elements 122 (e.g., an infrared LED array).

The battery compartment 104 may include a spring-loaded negative contact 124 for electrically coupling to a negative terminal 126 of the battery 106 and a spring-loaded positive contact 128 for electrically coupling to a positive terminal 130 of the battery 106. The battery 106 may be any battery 106 that has a negative terminal 126 and a positive terminal 130 on opposing end portions of the battery 106, such as a so-called AA battery, AAA battery, C battery, D battery, etc. In addition, a single battery 106 is shown in FIG. 1. However, concepts from the present disclosure may be applied to controllers that are powered by multiple batteries. In some examples, the negative terminal 126 may include a generally planar conductive contact and the positive terminal 130 may include a protruding conductive contact.

The spring-loaded negative contact 124 and the spring-loaded positive contact 128 may be positioned at an initial distance from each other to apply a compressive force on the battery 106 when the battery 106 is installed in the battery compartment 104. For example, each of the spring-loaded negative contact 124 and the spring-loaded positive contact 128 may be at least partially compressed when the battery 106 is installed. This compression may retain the battery 106 in place within the battery compartment 104 and may maintain electrical contact with the spring-loaded negative contact 124 and the spring-loaded positive contact 128, even when the handheld controller 100 is moved quickly and/or at a high acceleration.

Although the handheld controller 100 of FIG. 1 is illustrated as an artificial-reality controller (e.g., a controller configured for use in or with an artificial-reality system), the present disclosure is not so limited. For example, the handheld controller 100 with a battery compartment 104 including a spring-loaded negative contact 124 and a spring-loaded positive contact 128 may be configured for use with a computing system, a gaming system, etc., according to additional embodiments of the present disclosure. In some examples, certain features and elements of the handheld controller 100 may be omitted or combined in different ways, such as for adaptation to uses other than with artificial-reality systems or to accommodate different user inputs 110.

Figure 2:
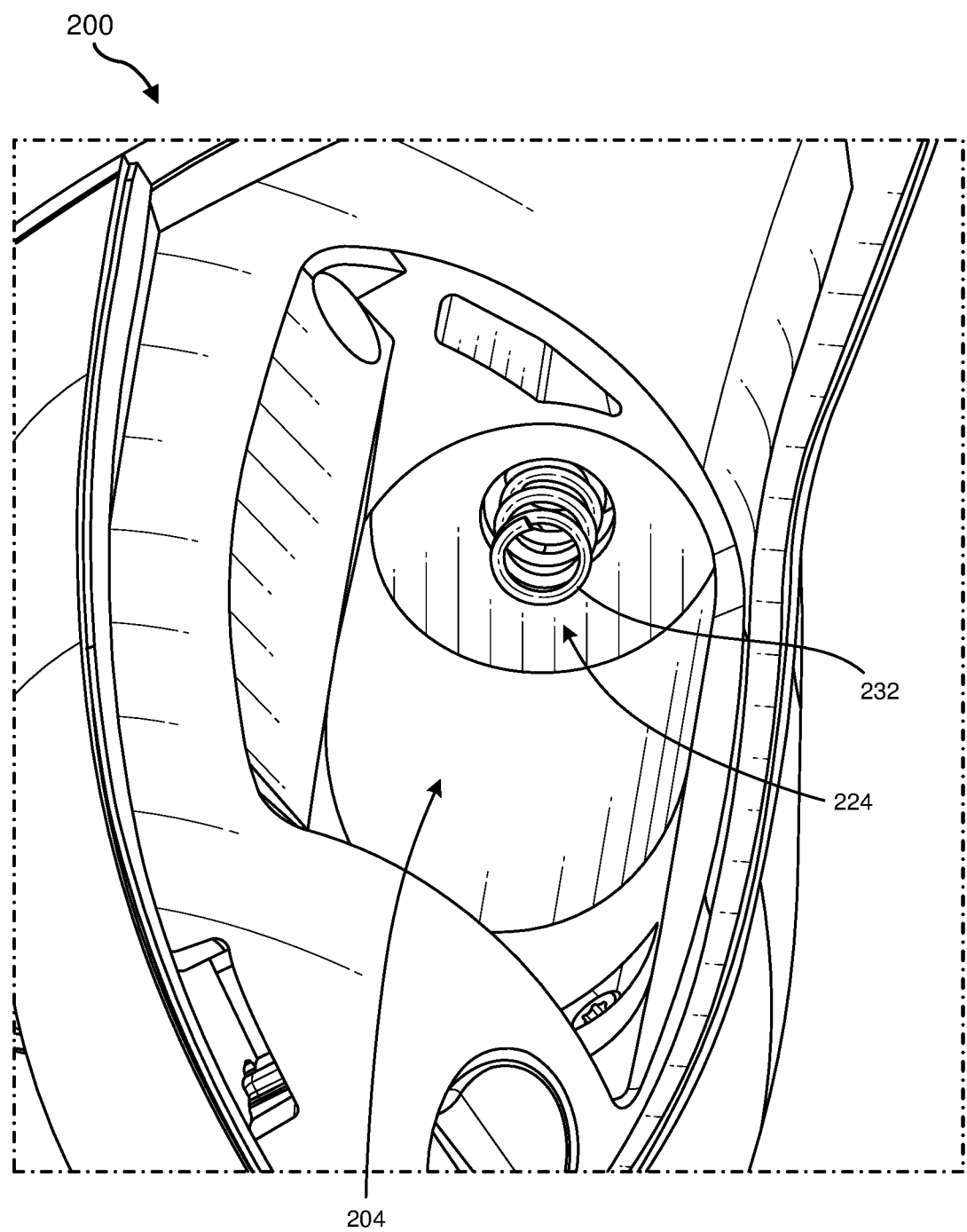
FIG. 2 is a detailed perspective view of a portion of a handheld controller including a spring-loaded negative contact in a battery compartment, according to at least one embodiment of the present disclosure.

FIG. 2 is a detailed perspective view of a portion of a handheld controller 200 including a spring-loaded negative contact 224 in a battery compartment 204. As shown in FIG. 2, the spring-loaded negative contact 224 may be or include a coil spring 232, which may include a conductive material (e.g., a metal material) for electrically coupling a battery to the handheld controller 200. Thus, a base portion of the coil spring 232 may be operably coupled to electronic components of the handheld controller 200 to provide power to those electronic components. The spring-loaded negative contact 224 may be positioned generally centrally at one end of the battery compartment 204 opposite a corresponding spring-loaded positive contact to apply a compressive retaining force to an installed battery.

Figure 3:
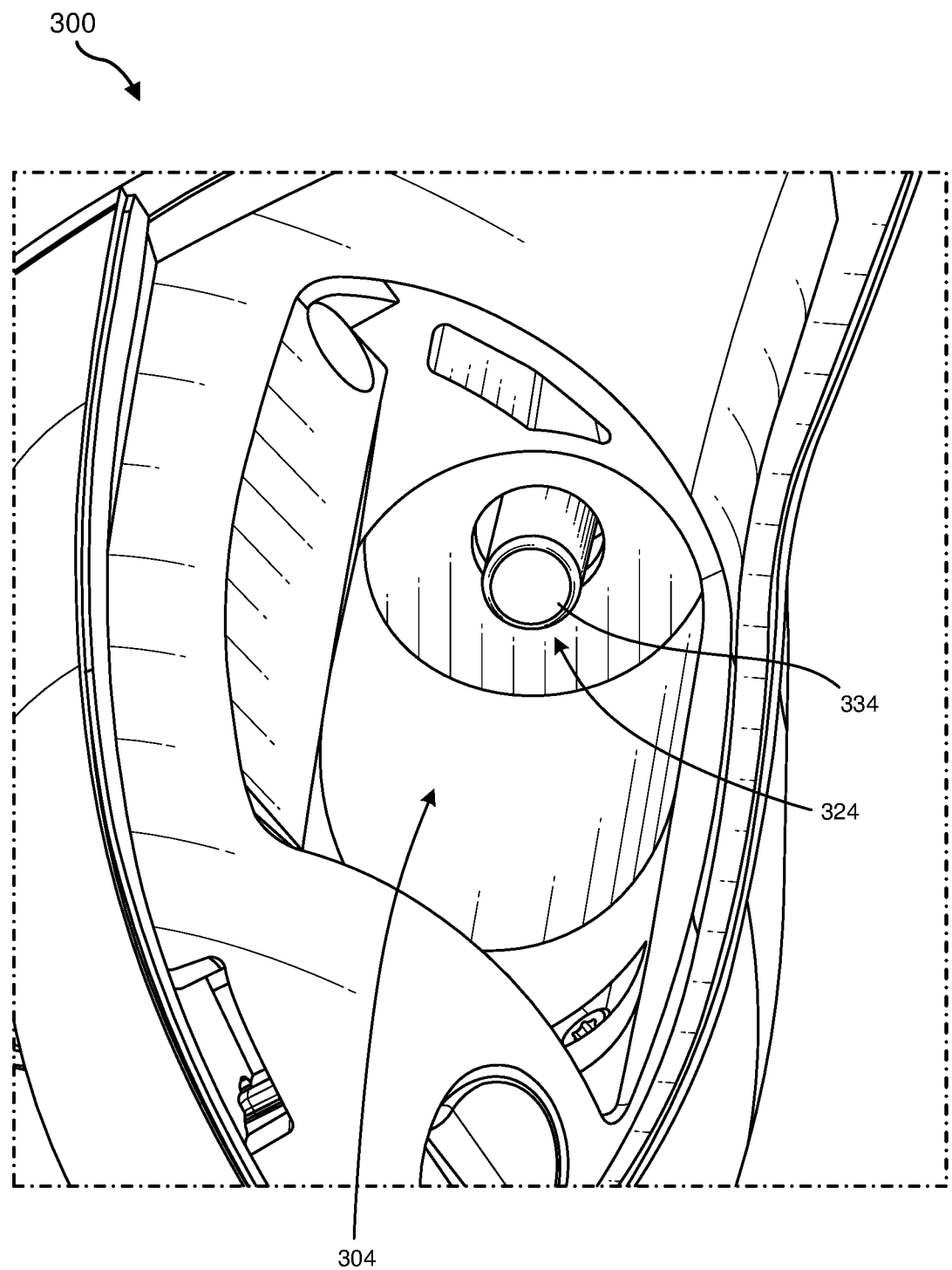
FIG. 3 is a detailed perspective view of a portion of a handheld controller including a spring-loaded negative contact in a battery compartment, according to at least one additional embodiment of the present disclosure.

FIG. 3 is a detailed perspective view of a portion of a handheld controller 300 including a negative contact 324 in a battery compartment 304, according to additional embodiments of the present disclosure. As shown in FIG. 3, the spring-loaded negative contact 324 may include a conductive cap 334, which may include a conductive material (e.g., a metal material) for electrically coupling a battery to the handheld controller 300. Thus, the conductive cap 334 may be operably coupled to electronic components of the handheld controller 300 to provide power to those electronic components. The conductive cap 334 may be biased to apply a compressive retaining force to an installed battery. For example, a spring element (e.g., the coil spring 232 of FIG. 2) may be positioned at least partially within the conductive cap 334 or may apply a spring force to a base portion of the conductive cap 334. The conductive cap 334 may have a convex surface for electrically coupling to and abutting against a negative terminal of an installed battery.

Figure 4:
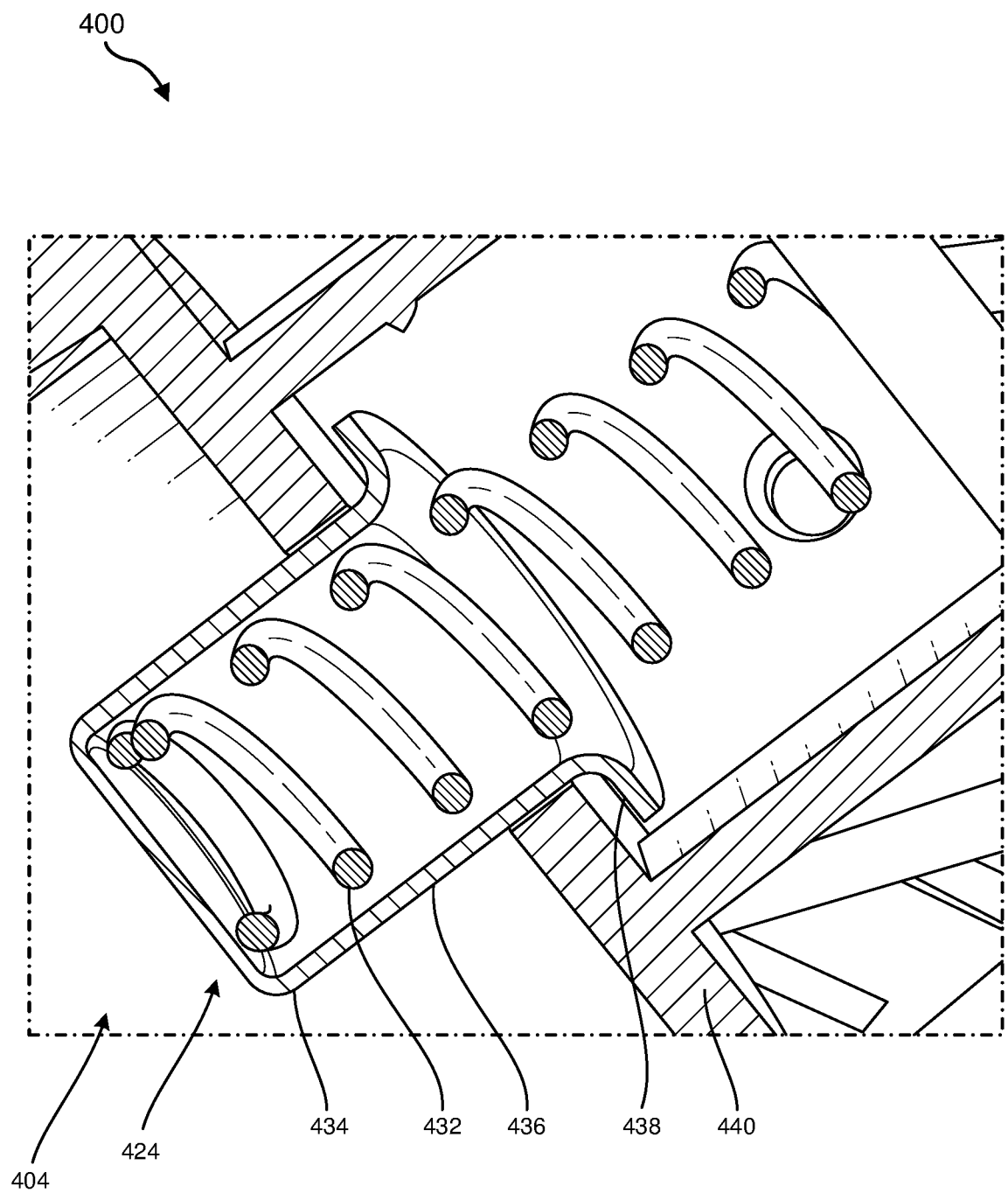
FIG. 4 is a detailed cross-sectional view of a spring-loaded negative contact of a handheld controller, according to at least one additional embodiment of the present disclosure.

FIG. 4 is a detailed cross-sectional view of a spring-loaded negative contact 424 of a handheld controller 400 that includes a coil spring 432 and a conductive cap 434 positioned at least partially over the coil spring 432. As shown in FIG. 4, the conductive cap 434 may include a convex surface for electrically coupling to and abutting against a negative terminal of an installed battery. In some examples, the conductive cap 434 may include a generally cylindrical body 436. A flange 438 at the base of the conductive cap 434 may be shaped and sized for retaining the conductive cap 434 in a housing 440 of a battery compartment 404 of the handheld controller 400 as the conductive cap 434 protrudes through a hole in the housing 440. The flange 438 may provide a stop against the housing 440 when the conductive cap 434 is biased to its initial position (e.g., when no battery is installed) by the coil spring 432. A base of the coil spring 432 may be electrically coupled to electronic components of the handheld controller 400 for providing power to the electronic components.

Although the coil spring 432 is illustrated in FIG. 4 as biasing the conductive cap 434 to its initial position, the present disclosure is not so limited. In additional embodiments, the conductive cap 434 may be biased by another spring element, such as a flat spring, a cantilever spring, a volute spring, a spring washer, etc. The spring element may be a variable spring or a constant spring.

Figure 5:
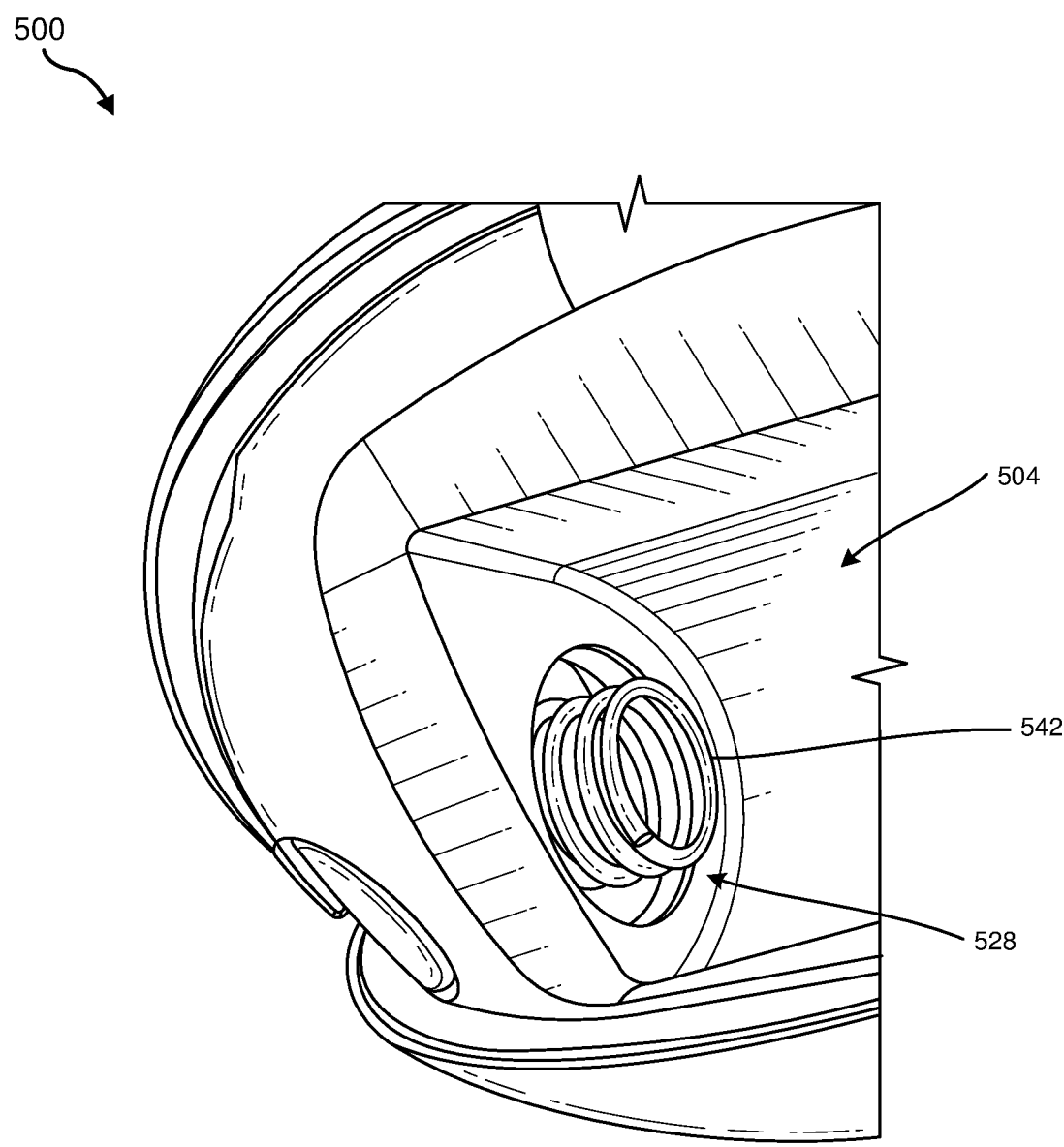
FIG. 5 is a detailed perspective view of a portion of a handheld controller including a spring-loaded positive contact in a battery compartment, according to at least one embodiment of the present disclosure.

FIG. 5 is a detailed perspective view of a portion of a handheld controller 500 including a spring-loaded positive contact 528 in a battery compartment 504. The spring-loaded positive contact 528 may be or include a coil spring 542, which may include a conductive material (e.g., a metal material) for electrically coupling a battery to the handheld controller 500. Thus, a base portion of the coil spring 542 may be operably coupled to electronic components of the handheld controller 500 to provide power to those electronic components. The spring-loaded positive contact 528 may be positioned generally centrally at one end of the battery compartment 504 opposite a corresponding spring-loaded negative contact to apply a compressive retaining force to an installed battery.

Figure 6:
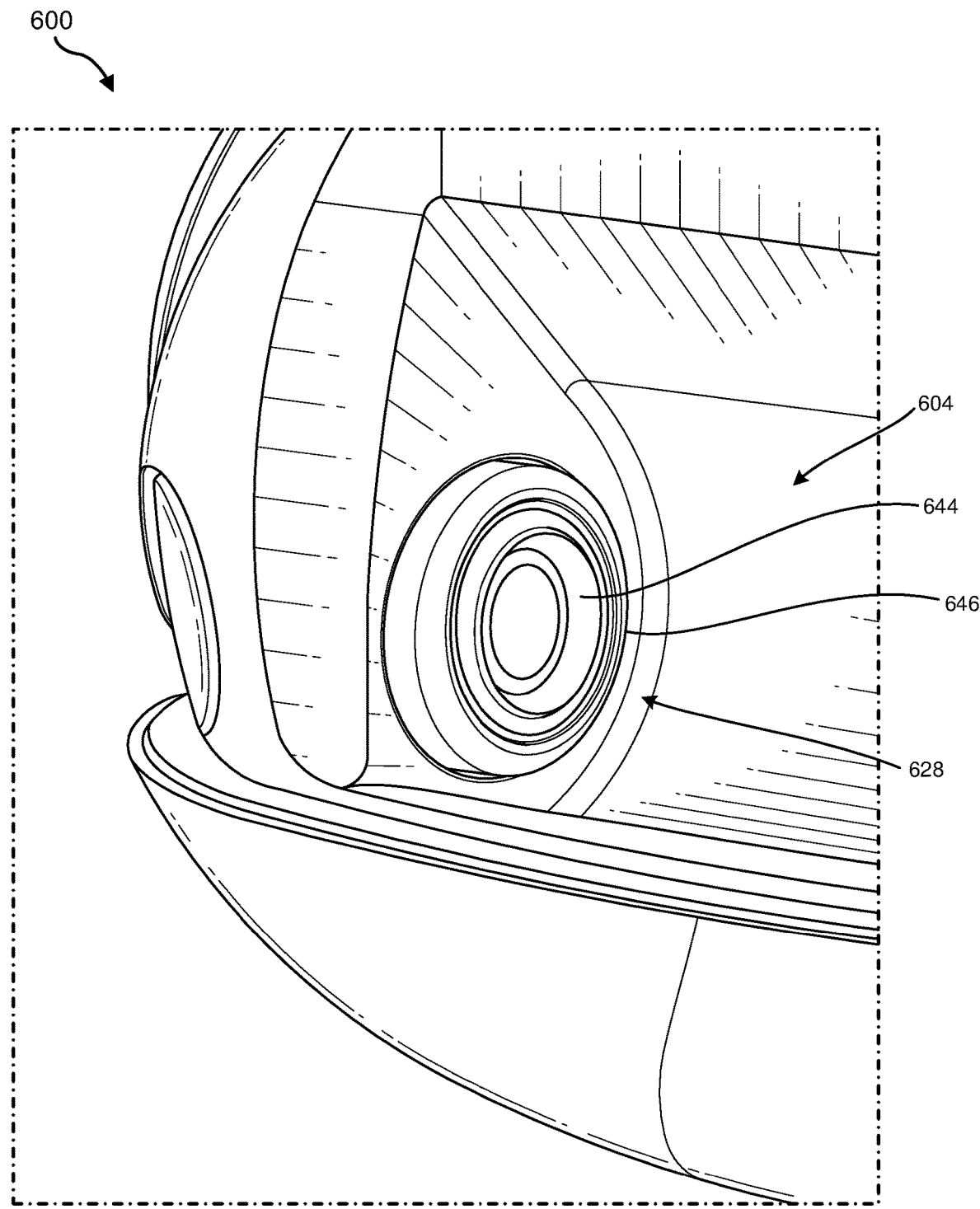
FIG. 6 is a detailed perspective view of a portion of a handheld controller including a positive contact in a battery compartment, according to at least one additional embodiment of the present disclosure

FIG. 6 is a detailed perspective view of a portion of a handheld controller 600 including a spring-loaded positive contact 628 in a battery compartment 604, according to additional embodiments of the present disclosure. As shown in FIG. 6, the spring-loaded positive contact 628 may include a conductive cap 644, which may include a conductive material (e.g., a metal material) for electrically coupling a battery to the handheld controller 600. Thus, the conductive cap 644 may be operably coupled to electronic components of the handheld controller 600 to provide power to those electronic components. The conductive cap 644 may be biased to apply a compressive retaining force to an installed battery. For example, a spring element (e.g., the coil spring 542 of FIG. 5) may be positioned at least partially within the conductive cap 644 or may apply a spring force to a base portion of the conductive cap 644. The conductive cap 644 may have a concave surface for electrically coupling to and abutting against a positive terminal of an installed battery. In some examples, the concave surface may retain a portion of the positive terminal of the battery in position and may inhibit (e.g., reduce or eliminate) lateral movement of the positive terminal of the battery.

In some examples, an isolation ring 646 may at least partially surround the spring-loaded positive contact 628. The isolation ring 646 may electrically isolate at least a portion of the spring-loaded positive contact 628 from other components of the handheld controller 600 that are adjacent to the spring-loaded positive contact 628. In some examples, a similar isolation ring 646 may additionally or alternatively be positioned to at least partially surround a corresponding spring-loaded negative contact (e.g., the spring-loaded negative contact 324 of FIG. 3). For example, the isolation ring 646 may be a substantially cylindrical element that includes an electrically insulating material, such as a polymer (e.g., rubber, silicone, etc.).

Figure 7:
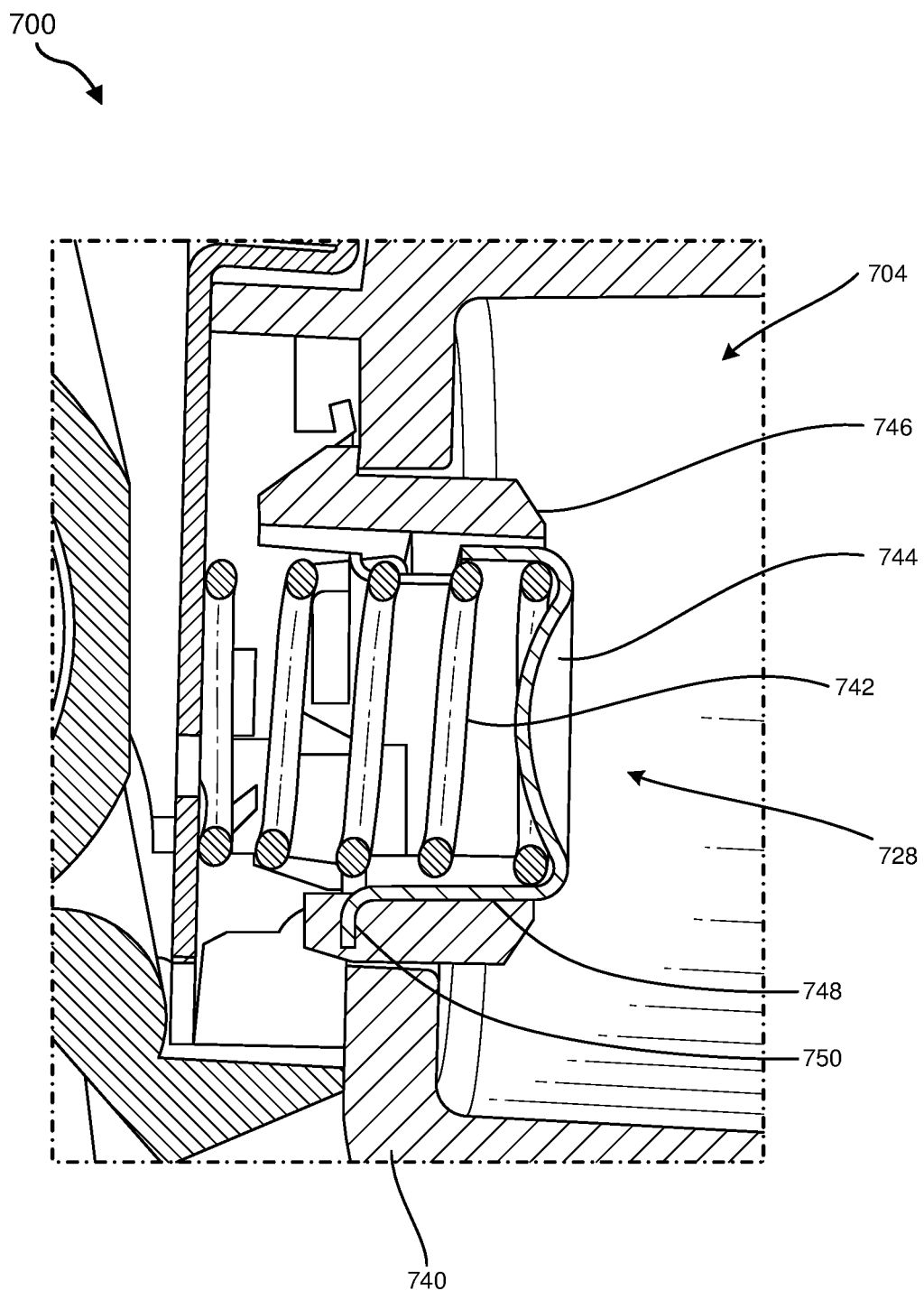
FIG. 7 is a detailed cross-sectional view of a positive contact, according to at least one additional embodiment of the present disclosure
Figure 8:
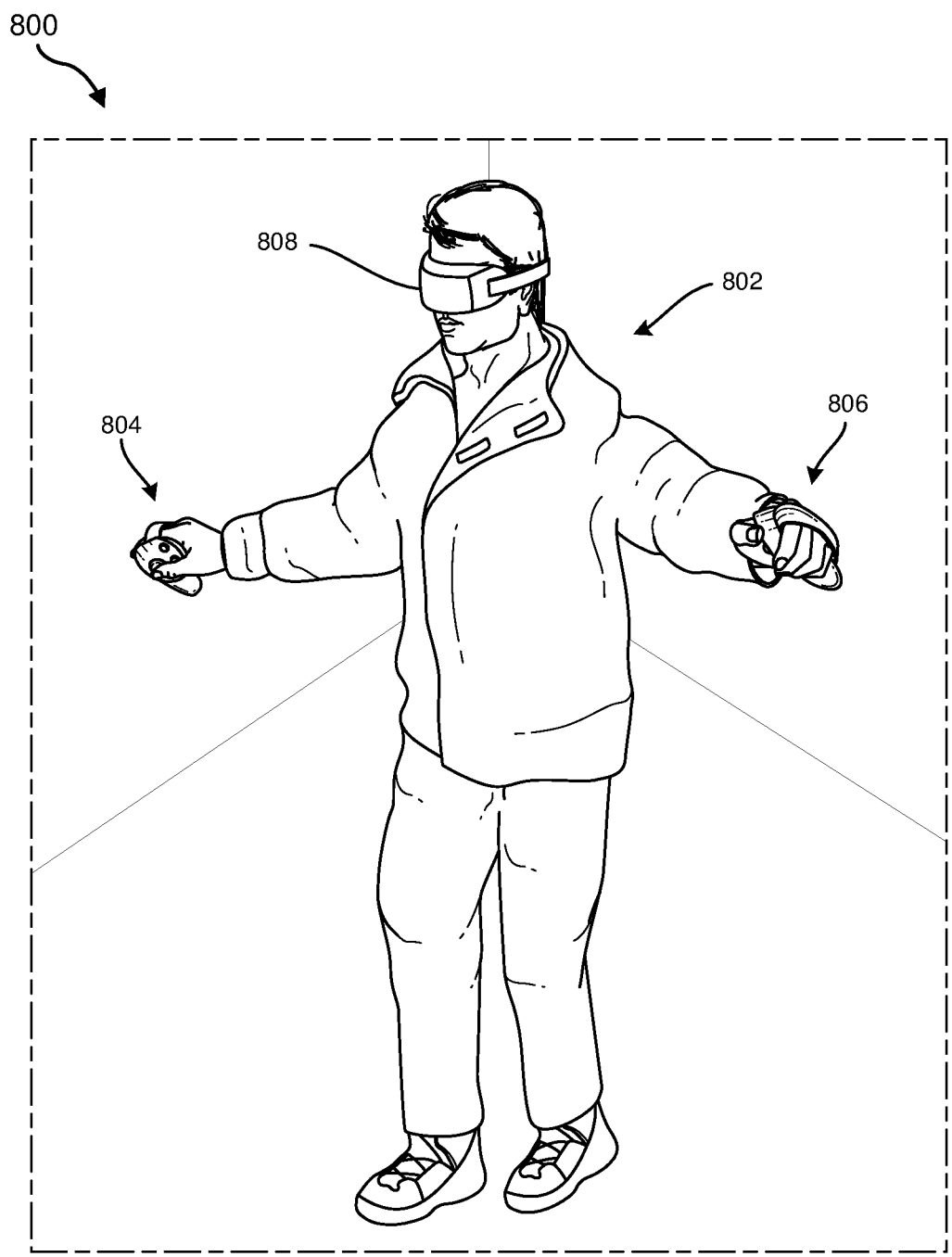
FIG. 8 is a perspective view of a user in an artificial-reality environment using handheld controllers, according to at least one embodiment of the present disclosure.

FIG. 7 is a detailed cross-sectional view of a spring-loaded positive contact 728 of a handheld controller 700 that includes a coil spring 742 and a conductive cap 744 positioned at least partially over the coil spring 742. As shown in FIG. 7, the conductive cap 744 may include a concave surface for electrically coupling to and abutting against a negative terminal of an installed battery. In some examples, the conductive cap 744 may include a generally cylindrical body 748. A flange 750 at the base of the conductive cap 744 may be shaped and sized for retaining the conductive cap 744 in a housing 740 of a battery compartment 704 as the conductive cap 744 protrudes through a hole in the housing 740. An isolation ring 746 may electrically isolate the spring-loaded positive contact 728 from adjacent elements of the handheld controller 700.

FIG. 8 is a perspective view of a user 802 in an artificial-reality environment 800 using handheld controllers 804 and 806. The handheld controllers 804 and 806 may be configured to manipulate computer-generated images generated by a head-mounted display 808 donned by the user 802. For example, the user 802 may manipulate the computer-generated images by interacting with (e.g., moving, rotating, tilting, pressing a button, moving a thumbstick, pulling a trigger, touching a touch-sensitive surface, etc.) one or both of the handheld controllers 804 and 806. The handheld controllers 804 and 806 may include a battery compartment that has a spring-loaded negative contact for electrically coupling to a negative terminal of an installed battery and a spring-loaded positive contact for electrically coupling to a positive terminal of the installed battery. For example, the handheld controllers 804 and 806 may incorporate such features as described above with reference to FIGS. 1-7. Thus, the spring-loaded positive and negative contacts may retain the batteries powering the handheld controllers 804 and 806 in position to provide power to the handheld controllers 804 and 806 when the user moves the handheld controllers 804 and 806 in space.

FIG. 9 is a flow diagram of an example method 900 of retaining a replaceable battery in a handheld controller. At operation 910, a replaceable battery may be positioned within a battery compartment of a handheld controller. At operation 920, a spring-loaded negative contact in the battery compartment may be depressed with a negative terminal of the battery. For example, a conductive coil spring, a conductive cap, or a combination of a conductive coil spring and a conductive cap (as illustrated above in FIGS. 2-4) may be depressed with the negative terminal of the battery. In some embodiments, a conductive cap of the negative terminal may include a convex surface for electrically coupling to the negative terminal of the battery.

At operation 930, a spring-loaded positive contact in the battery compartment may be depressed with a positive terminal of the battery. For example, a conductive coil spring, a conductive cap, or a combination of a conductive coil spring and a conductive cap (as illustrated above in FIGS. 5-7) may be depressed with the positive terminal of the battery. In some embodiments, a conductive cap of the positive terminal may include a concave surface for electrically coupling to the positive terminal of the battery.

At operation 940, the battery may be retained in the battery compartment with spring forces from both the spring-loaded negative contact and the spring-loaded positive contact. In some embodiments, both of the spring-loaded negative contact and the spring-loaded positive contact may be at least partially compressed when the battery is installed in the battery compartment.

Accordingly, the present disclosure includes mechanisms and methods for battery retention in handheld controllers. Both a spring-loaded negative contact and a spring-loaded positive contact may be employed to retain the batteries in the handheld controllers. By spring-loading both the negative contact and the positive contact, the batteries may be retained more securely than in conventional handheld controllers employing only one spring-loaded contact. The secure battery retention may be achieved even when a user rapidly moves and accelerates the handheld controller in space.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Figure 11:
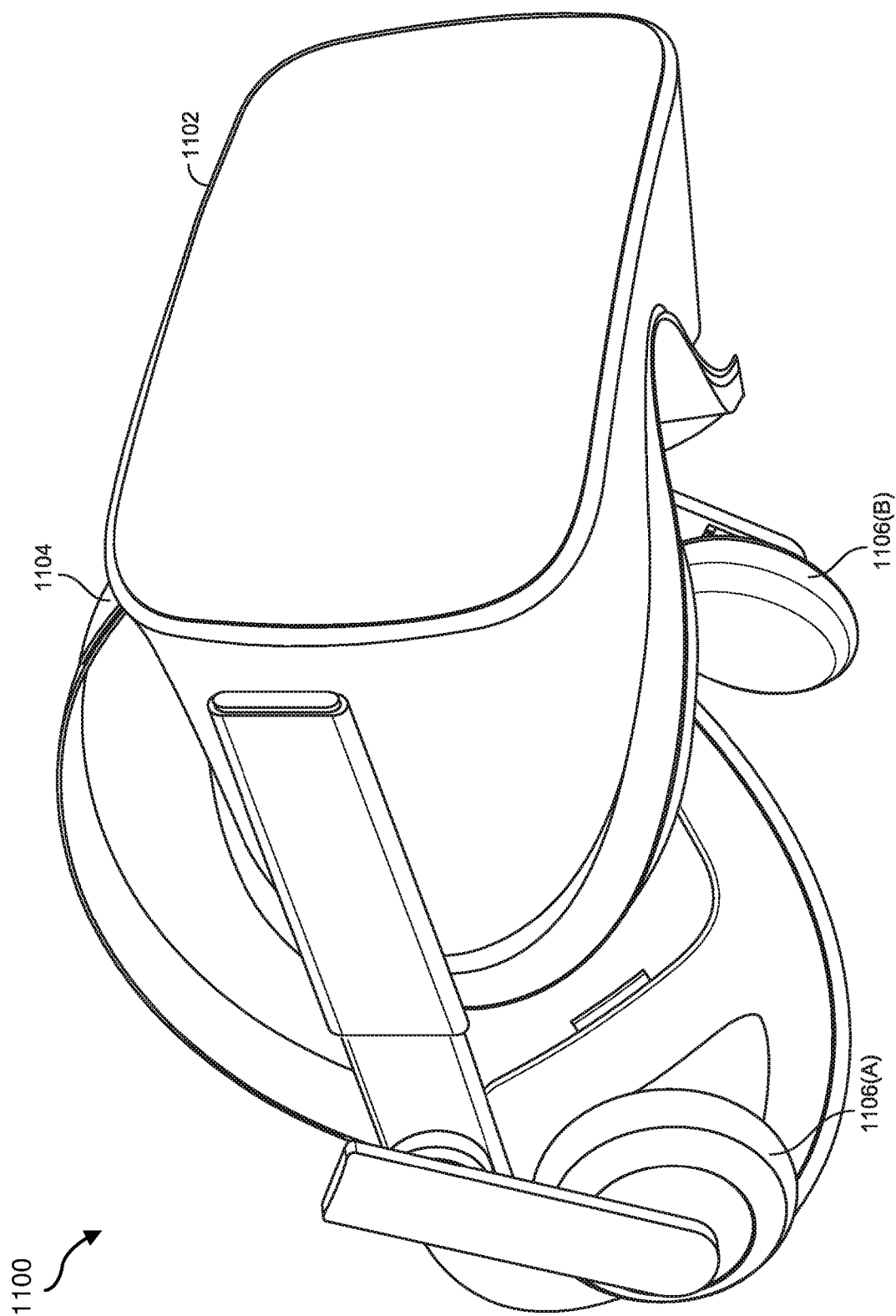
FIG. 11 is an illustration of an example virtual-reality headset that may be used in connection with embodiments of this disclosure.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 1000 in FIG. 10) or that visually immerses a user in an artificial reality (such as, e.g., virtual-reality system 1100 in FIG. 11). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Turning to FIG. 10, the augmented-reality system 1000 may include an eyewear device 1002 with a frame 1010 configured to hold a left display device 1015(A) and a right display device 1015(B) in front of a user's eyes. The display devices 1015(A) and 1015(B) may act together or independently to present an image or series of images to a user. While the augmented-reality system 1000 includes two displays, embodiments of this disclosure may be implemented in augmented-reality systems with a single NED or more than two NEDs.

In some embodiments, the augmented-reality system 1000 may include one or more sensors, such as sensor 1040. The sensor 1040 may generate measurement signals in response to motion of the augmented-reality system 1000 and may be located on substantially any portion of the frame 1010. The sensor 1040 may represent one or more of a variety of different sensing mechanisms, such as a position sensor, an inertial measurement unit (IMU), a depth camera assembly, a structured light emitter and/or detector, or any combination thereof. In some embodiments, the augmented-reality system 1000 may or may not include the sensor 1040 or may include more than one sensor. In embodiments in which the sensor 1040 includes an IMU, the IMU may generate calibration data based on measurement signals from the sensor 1040. Examples of the sensor 1040 may include, without limitation, accelerometers, gyroscopes, magnetometers, other suitable types of sensors that detect motion, sensors used for error correction of the IMU, or some combination thereof.

In some examples, the augmented-reality system 1000 may also include a microphone array with a plurality of acoustic transducers 1020(A)-1020(J), referred to collectively as acoustic transducers 1020. The acoustic transducers 1020 may represent transducers that detect air pressure variations induced by sound waves. Each acoustic transducer 1020 may be configured to detect sound and convert the detected sound into an electronic format (e.g., an analog or digital format). The microphone array in FIG. 11 may include, for example, ten acoustic transducers: 1020(A) and 1020(B), which may be designed to be placed inside a corresponding ear of the user, acoustic transducers 1020(C), 1020(D), 1020(E), 1020(F), 1020(G), and 1020(H), which may be positioned at various locations on the frame 1010, and/or acoustic transducers 1020(I) and 1020(J), which may be positioned on a corresponding neckband 1005.

In some embodiments, one or more of the acoustic transducers 1020(A)-(F) may be used as output transducers (e.g., speakers). the For example, acoustic transducers 1020(A) and/or 1020(B) may be earbuds or any other suitable type of headphone or speaker.

The configuration of the acoustic transducers 1020 of the microphone array may vary. While the augmented-reality system 1000 is shown in FIG. 10 as having ten acoustic transducers 1020, the number of acoustic transducers 1020 may be greater or less than ten. In some embodiments, using higher numbers of the acoustic transducers 1020 may increase the amount of audio information collected and/or the sensitivity and accuracy of the audio information. In contrast, using a lower number of the acoustic transducers 1020 may decrease the computing power required by an associated controller 1050 to process the collected audio information. In addition, the position of each acoustic transducer 1020 of the microphone array may vary. For example, the position of the acoustic transducers 1020 may include a defined position on the user, a defined coordinate on the frame 1010, an orientation associated with each acoustic transducer 1020, or some combination thereof.

The acoustic transducers 1020(A) and 1020(B) may be positioned on different parts of the user's ear, such as behind the pinna, behind the tragus, and/or within the auricle or fossa. Or, there may be additional acoustic transducers 1020 on or surrounding the ear in addition to the acoustic transducers 1020 inside the ear canal. Having an acoustic transducer 1020 positioned next to an ear canal of a user may enable the microphone array to collect information on how sounds arrive at the ear canal. By positioning at least two of the acoustic transducers 1020 on either side of a user's head (e.g., as binaural microphones), the augmented-reality device 1000 may simulate binaural hearing and capture a 3D stereo sound field around about a user's head. In some embodiments, the acoustic transducers 1020(A) and 1020(B) may be connected to the augmented-reality system 1000 via a wired connection 1030, and in other embodiments the acoustic transducers 1020(A) and 1020(B) may be connected to the augmented-reality system 1000 via a wireless connection (e.g., a Bluetooth connection). In still other embodiments, the acoustic transducers 1020(A) and 1020(B) may not be used at all in conjunction with the augmented-reality system 1000.

The acoustic transducers 1020 on the frame 1010 may be positioned in a variety of different ways, including along the length of the temples, across the bridge, above or below the display devices 1015(A) and 1015(B), or some combination thereof. The acoustic transducers 1020 may also be oriented such that the microphone array is able to detect sounds in a wide range of directions surrounding the user wearing the augmented-reality system 1000. In some embodiments, an optimization process may be performed during manufacturing of the augmented-reality system 1000 to determine relative positioning of each acoustic transducer 1020 in the microphone array.

In some examples, the augmented-reality system 1000 may include or be connected to an external device (e.g., a paired device), such as the neckband 1005. The neckband 1005 generally represents any type or form of paired device. Thus, the following discussion of the neckband 1005 may also apply to various other paired devices, such as charging cases, smart watches, smart phones, wrist bands, other wearable devices, hand-held controllers, tablet computers, laptop computers, other external compute devices, etc.

As shown, the neckband 1005 may be coupled to the eyewear device 1002 via one or more connectors. The connectors may be wired or wireless and may include electrical and/or non-electrical (e.g., structural) components. In some cases, the eyewear device 1002 and the neckband 1005 may operate independently without any wired or wireless connection between them. While FIG. 10 illustrates the components of the eyewear device 1002 and the neckband 1005 in example locations on the eyewear device 1002 and neckband 1005, the components may be located elsewhere and/or distributed differently on the eyewear device 1002 and/or the neckband 1005. In some embodiments, the components of the eyewear device 1002 and neckband 1005 may be located on one or more additional peripheral devices paired with the eyewear device 1002, the neckband 1005, or some combination thereof.

Pairing external devices, such as the neckband 1005, with augmented-reality eyewear devices may enable the eyewear devices to achieve the form factor of a pair of glasses while still providing sufficient battery and computation power for expanded capabilities. Some or all of the battery power, computational resources, and/or additional features of the augmented-reality system 1000 may be provided by a paired device or shared between a paired device and an eyewear device, thus reducing the weight, heat profile, and form factor of the eyewear device overall while still retaining desired functionality. For example, the neckband 1005 may allow components that would otherwise be included on an eyewear device to be included in the neckband 1005 since users may tolerate a heavier weight load on their shoulders than they would tolerate on their heads. The neckband 1005 may also have a larger surface area over which to diffuse and disperse heat to the ambient environment. Thus, the neckband 1005 may allow for greater battery and computation capacity than might otherwise have been possible on a stand-alone eyewear device. Since weight carried in the neckband 1005 may be less invasive to a user than weight carried in the eyewear device 1002, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

The neckband 1005 may be communicatively coupled with the eyewear device 1002 and/or to other devices. These other devices may provide certain functions (e.g., tracking, localizing, depth mapping, processing, storage, etc.) to the augmented-reality system 1000. In the embodiment of FIG. 10, the neckband 1005 may include two acoustic transducers (e.g., 1020(1) and 1020(J)) that are part of the microphone array (or potentially form their own microphone subarray). The neckband 1005 may also include a controller 1025 and a power source 1035.

The acoustic transducers 1020(1) and 1020(J) of the neckband 1005 may be configured to detect sound and convert the detected sound into an electronic format (analog or digital). In the embodiment of FIG. 10, the acoustic transducers 1020(I) and 1020(J) may be positioned on the neckband 1005, thereby increasing the distance between the neckband acoustic transducers 1020(I) and 1020(J) and other acoustic transducers 1020 positioned on the eyewear device 1002. In some cases, increasing the distance between the acoustic transducers 1020 of the microphone array may improve the accuracy of beamforming performed via the microphone array. For example, if a sound is detected by the acoustic transducers 1020(C) and 1020(D) and the distance between the acoustic transducers 1020(C) and 1020(D) is greater than, e.g., the distance between the acoustic transducers 1020(D) and 1020(E), the determined source location of the detected sound may be more accurate than if the sound had been detected by the acoustic transducers 1020(D) and 1020(E).

The controller 1025 of the neckband 1005 may process information generated by the sensors on the neckband 1005 and/or the augmented-reality system 1000. For example, the controller 1025 may process information from the microphone array that describes sounds detected by the microphone array. For each detected sound, the controller 1025 may perform a direction-of-arrival (DOA) estimation to estimate a direction from which the detected sound arrived at the microphone array. As the microphone array detects sounds, the controller 1025 may populate an audio data set with the information. In embodiments in which the augmented-reality system 1000 includes an inertial measurement unit, the controller 1025 may compute all inertial and spatial calculations from the IMU located on the eyewear device 1002. A connector may convey information between the augmented-reality system 1000 and the neckband 1005 and between the augmented-reality system 1000 and the controller 1025. The information may be in the form of optical data, electrical data, wireless data, or any other transmittable data form. Moving the processing of information generated by the augmented-reality system 1000 to the neckband 1005 may reduce weight and heat in the eyewear device 1002, making it more comfortable to the user.

The power source 1035 in n the neckband 1005 may provide power to the eyewear device 1002 and/or to the neckband 1005. The power source 1035 may include, without limitation, lithium ion batteries, lithium-polymer batteries, primary lithium batteries, alkaline batteries, or any other form of power storage. In some cases, the power source 1035 may be a wired power source. Including the power source 1035 on the neckband 1005 instead of on the eyewear device 1002 may help better distribute the weight and heat generated by the power source 1035.

As noted, some artificial-reality systems may, instead of blending an artificial reality with actual reality, substantially replace one or more of a user's sensory perceptions of the real world with a virtual experience. One example of this type of system is a head-worn display system, such as the virtual-reality system 1100 in FIG. 11, that mostly or completely covers a user's field of view. The virtual-reality system 1100 may include a front rigid body 1102 and a band 1104 shaped to fit around a user's head. The virtual-reality system 1100 may also include output audio transducers 1106(A) and 1106(B). Furthermore, while not shown in FIG. 11, the front rigid body 1102 may include one or more electronic elements, including one or more electronic displays, one or more inertial measurement units (IMUS), one or more tracking emitters or detectors, and/or any other suitable device or system for creating an artificial-reality experience.

Artificial-reality systems may include a variety of types of visual feedback mechanisms. For example, display devices in the augmented-reality system 1000 and/or the virtual-reality system 1100 may include one or more liquid crystal displays (LCDs), light emitting diode (LED) displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in the augmented-reality system 1000 and/or the virtual-reality system 1100 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, the augmented-reality system 1000 and/or virtual-reality system 1100 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

By way of non-limiting examples, the following embodiments are included in the present disclosure.

Example 1: A handheld controller may include a handle shaped and sized to be gripped by a user's hand and a battery compartment in the handle, the battery compartment configured to receive a replaceable battery having a first end portion with a negative terminal and a second end portion with a positive terminal, wherein the first end portion and the second end portion are opposite each other, wherein the battery compartment may include: a spring-loaded negative contact for electrically coupling to the negative terminal of the battery, and a spring-loaded positive contact for electrically coupling to the positive terminal of the battery.

Example 2: The handheld controller of Example 1, wherein each of the spring-loaded negative contact and the spring-loaded positive contact may include a coil spring.

Example 3: The handheld controller of Example 2, wherein at least one of the spring-loaded negative contact or the spring-loaded positive contact may include a conductive cap positioned over the coil spring.

Example 4: The handheld controller of Example 3, wherein at least one of the conductive caps may include a concave depression positioned to abut against the respective negative terminal or positive terminal of the battery.

Example 5: The handheld controller of Example 4, wherein the conductive cap of the spring-loaded positive contact may include the concave depression.

Example 6: The handheld controller of any of Examples 3 through 5, wherein at least one of the conductive caps may include a convex surface positioned to abut against the respective negative terminal or positive terminal of the battery.

Example 7: The handheld controller of Example 6, wherein the conductive cap of the negative contact may include the convex surface.

Example 8: The handheld controller of any of Examples 1 through 7, which may further include a multi-degree of freedom sensor for sensing movement of the handheld controller.

Example 9: The handheld controller of any of Examples 1 through 8, wherein the handheld controller may be an artificial-reality controller.

Example 10: The handheld controller of any of Examples 1 through 9, wherein the spring-loaded negative contact and the spring-loaded positive contact may be positioned at an initial distance from each other to apply a compressive force on the battery when the battery is installed in the battery compartment.

Example 11: The handheld controller of any of Examples 1 through 10, which may further include an electrically insulating isolation ring at least partially surrounding at least one of the spring-loaded negative contact or the spring-loaded positive contact.

Example 12: An artificial-reality system may include a head-mounted display configured to present computer-generated images to a user's eyes, and a handheld controller configured to provide an input for manipulating the computer-generated images presented by the head-mounted display, the handheld controller including: a battery compartment including a spring-loaded negative contact and a spring-loaded positive contact for respectively electrically coupling to a negative terminal of a battery and an opposing positive terminal of the battery.

Example 13: The artificial-reality system of Example 12, which may further include a tracking subsystem configured to track movement of the handheld controller through space.

Example 14: The artificial-reality system of Example 13, wherein the tracking subsystem may include at least one sensor internal to the handheld controller.

Example 15: The artificial-reality system of Example 14, wherein the at least one sensor may include an inertial measurement unit.

Example 16: The artificial-reality system of any of Examples 12 through 15, wherein the spring-loaded negative contact may include a convex conductive cap and the spring-loaded positive contact may include a concave conductive cap.

Example 17: A method of retaining a replaceable battery in a handheld controller may include: positioning a replaceable battery within a battery compartment of a handheld controller; depressing a spring-loaded negative contact in the battery compartment with a negative terminal of the battery; depressing a spring-loaded positive contact in the battery compartment with a positive terminal of the battery; and retaining the battery in the compartment with spring forces from both the spring-loaded negative contact and the spring-loaded positive contact.

Example 18: The method of Example 17, wherein depressing the spring-loaded negative contact may include abutting the negative terminal of the battery against a convex conductive cap of the spring-loaded negative contact.

Example 19: The method of Example 17 or 18, wherein depressing the spring-loaded positive contact may include abutting the positive terminal of the battery against a concave conductive cap of the spring-loaded positive contact.

Example 20: The method of any of Examples 17 through 19, wherein: depressing the spring-loaded negative contact may include compressing a first coil spring of the spring-loaded negative contact; and depressing the spring-loaded positive contact may include compressing a second coil spring of the spring-loaded positive contact.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A handheld controller, comprising:
   a handle shaped and sized to be gripped by a user's hand; and
   a battery compartment in the handle, the battery compartment configured to receive a replaceable cylindrical battery having a first end portion with a negative terminal and a second end portion with a positive terminal including a central protrusion, wherein the first end portion and the second end portion are in positions that are opposite each other, wherein the battery compartment comprises:
      a spring-loaded negative contact for electrically coupling to the negative terminal of the battery, the spring-loaded negative contact comprising a first coil spring and a first cylindrical conductive cap positioned over the first coil spring, the first cylindrical conductive cap comprising a first flange for retaining the first cylindrical conductive cap in a housing of the handle and a convex surface for abutting against the negative terminal of the battery; and
      a spring-loaded positive contact for electrically coupling to the positive terminal of the battery, the spring-loaded positive contact comprising a second coil spring and a second cylindrical conductive cap positioned over the second coil spring, the second conductive cap comprising:
         a second flange for retaining the second cylindrical conductive cap in the housing of the handle;
         a raised lip along a circumference of an end of the second cylindrical conductive cap; and
         a depression radially inward from the raised lip and on the end of the second cylindrical conductive cap, the depression forming a concave surface shaped and sized for abutting against the positive terminal of the battery and for receiving the central protrusion of the positive terminal of the battery.

2. The handheld controller of claim 1, further comprising a multi-degree of freedom sensor for sensing movement of the handheld controller.

3. The handheld controller of claim 1, wherein the handheld controller is an artificial-reality controller.

4. The handheld controller of claim 1, wherein the spring-loaded negative contact and the spring-loaded positive contact are positioned at an initial distance from each other to apply a compressive force on the battery when the battery is installed in the battery compartment.

5. The handheld controller of claim 1, further comprising an electrically insulating isolation ring at least partially surrounding at least one of the spring-loaded negative contact or the spring-loaded positive contact.

6. The handheld controller of claim 1, wherein the first flange extends radially outward from an end of the first cylindrical conductive cap opposite the convex surface.

7. The handheld controller of claim 1, wherein the second flange extends radially outward from an end of the second cylindrical conductive cap opposite the concave surface.

8. An artificial-reality system, comprising:
   a head-mounted display configured to present computer-generated images to a user's eyes; and a handheld controller configured to provide an input for manipulating the computer-generated images presented by the head-mounted display, the handheld controller comprising:
- a battery compartment comprising a spring-loaded negative contact and a spring-loaded positive contact for respectively electrically coupling to a negative terminal of a cylindrical battery and an opposing positive terminal of the battery, the positive terminal comprising a central protrusion, wherein:
  - the spring-loaded negative contact comprises a convex conductive cap having a cylindrical shape and a first flange to retain the spring-loaded negative contact in the battery compartment; and
  - the spring-loaded positive contact comprises a concave conductive cap having a cylindrical shape, a raised lip along a circumference of an end of the concave conductive cap, a depression radially inward from the raised lip defining a concave surface shaped and sized for receiving the central protrusion of the positive terminal of the battery, and a second flange to retain the spring-loaded negative contact in the battery compartment.

9. The artificial-reality system of claim 8, further comprising a tracking subsystem configured to track movement of the handheld controller through space.

10. The artificial-reality system of claim 9, wherein the tracking subsystem comprises at least one sensor internal to the handheld controller.

11. The artificial-reality system of claim 10, wherein the at least one sensor comprises an inertial measurement unit.

12. A method of retaining a replaceable battery in a handheld controller, the method comprising:

positioning a replaceable cylindrical battery within a battery compartment of a handheld controller;

depressing a spring-loaded negative contact in the battery compartment with a negative terminal of the battery by abutting the negative terminal of the battery with a convex surface of a first cylindrical conductive cap;

retaining the spring-loaded negative contact in the battery compartment with a first flange of the first cylindrical conductive cap;

depressing a spring-loaded positive contact in the battery compartment with a positive terminal of the battery by abutting the positive terminal of the battery with a second cylindrical conductive cap of the spring-loaded positive contact and positioning a central protrusion of the positive terminal of the battery within a concave surface on an end of the second cylindrical conductive cap;

retaining the spring-loaded positive contact in the battery compartment with a second flange of the second cylindrical conductive cap of the spring-loaded positive contact; and retaining the battery in the battery compartment with spring forces from both the spring-loaded negative contact and the spring-loaded positive contact.

13. The method of claim 12, wherein:

depressing the spring-loaded negative contact comprises compressing a first coil spring abutting the first cylindrical conductive cap of the spring-loaded negative contact; and depressing the spring-loaded positive contact comprises compressing a second coil spring abutting the second cylindrical conductive cap of the spring-loaded positive contact.

* * * * *